United States Patent
Kajihara et al.

(10) Patent No.: US 9,094,051 B2
(45) Date of Patent: Jul. 28, 2015

(54) POWER TRANSMITTER, POWER RECEIVER AND POWER TRANSMISSION AND RECEPTION SYSTEM

(71) Applicant: KABUSHIKI KAISHA TOSHIBA, Minato-Ku, Tokyo (JP)

(72) Inventors: Hirotsugu Kajihara, Yokohama (JP); Tomoya Horiguchi, Tokyo (JP); Ichiro Seto, Tokyo (JP); Toshiki Miyasaka, Saitama (JP); Yoshinari Kumaki, Yokohama (JP); Kiyoshi Toshimitsu, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 202 days.

(21) Appl. No.: 13/780,047

(22) Filed: Feb. 28, 2013

(65) Prior Publication Data
US 2013/0324038 A1    Dec. 5, 2013

(30) Foreign Application Priority Data
Jun. 1, 2012 (JP) .................................. 2012-126071

(51) Int. Cl.
*H04B 5/00* (2006.01)
(52) U.S. Cl.
CPC ............ *H04B 5/0031* (2013.01); *H04B 5/0037* (2013.01); *H04B 5/0075* (2013.01)
(58) Field of Classification Search
USPC ............... 455/41.1, 522, 572, 41.2, 574, 573, 455/343.1, 67.11, 41.3, 553.1, 66, 88, 115, 455/127
See application file for complete search history.

(56) References Cited

U.S. PATENT DOCUMENTS

2006/0052005 A1* 3/2006 Zhang et al. .................. 439/607
2007/0010295 A1* 1/2007 Greene et al. ................. 455/572
(Continued)

FOREIGN PATENT DOCUMENTS

| JP | 09148971 A | 6/1997 |
| JP | 2005094672 A | 4/2005 |

(Continued)

OTHER PUBLICATIONS

Wireless Power Consortium, "System Description Wireless Power Transfer vol. I: Low Power Part 1: Interface Definition Version 1.0.3," Sep. 2011. http://www.wirelesspowerconsortium.com/developers/specification.html p. 51 6 Communications Interface.
Japanese Office Action (and English translation thereof) dated May 29, 2015, issued in counterpart Japanese Application No. 2012-126071.

*Primary Examiner* — Ganiyu A Hanidu
(74) *Attorney, Agent, or Firm* — Holtz, Holtz, Goodman & Chick PC

(57) ABSTRACT

According to one embodiment, a power transmission and reception system includes a power transmitter and a power receiver. The power transmitter includes a power transmission module configured to wireless-transmit power to the power receiver; and a first wireless communication module configured to perform wireless communication of data frame having data with the power receiver. The power receiver includes a power reception module configured to receive the power transmitted from the power transmission module; and a second wireless communication module configured to perform wireless communication of the data frame with the first wireless communication module using the received power. The second wireless communication module is configured to perform wireless communication while the power reception module is not receiving the power.

19 Claims, 14 Drawing Sheets

(56) References Cited

U.S. PATENT DOCUMENTS

| | | | |
|---|---|---|---|
| 2009/0040965 A1* | 2/2009 | Matsuo et al. | 370/328 |
| 2009/0108680 A1* | 4/2009 | Minemura | 307/104 |
| 2010/0264746 A1 | 10/2010 | Kazama et al. | |
| 2010/0311327 A1 | 12/2010 | Hamada | |
| 2011/0025265 A1 | 2/2011 | Mochida et al. | |
| 2012/0062203 A1* | 3/2012 | Kim | 323/304 |

FOREIGN PATENT DOCUMENTS

| | | |
|---|---|---|
| JP | 2009253649 A | 10/2009 |
| JP | 2010130835 A | 6/2010 |
| JP | 2010237781 A | 10/2010 |
| JP | 2010239781 A | 10/2010 |
| WO | 2009122471 A1 | 10/2009 |

\* cited by examiner

25'

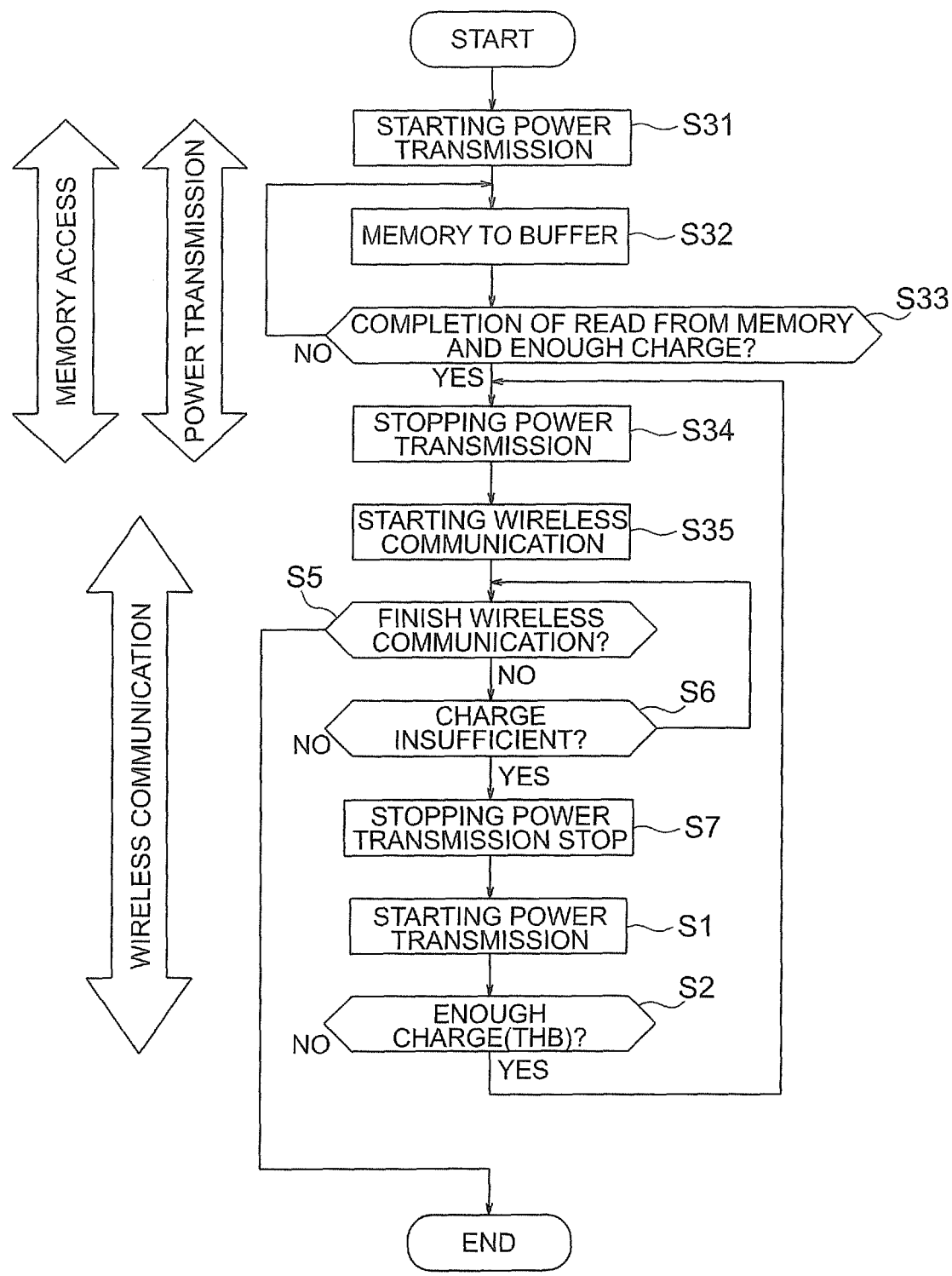

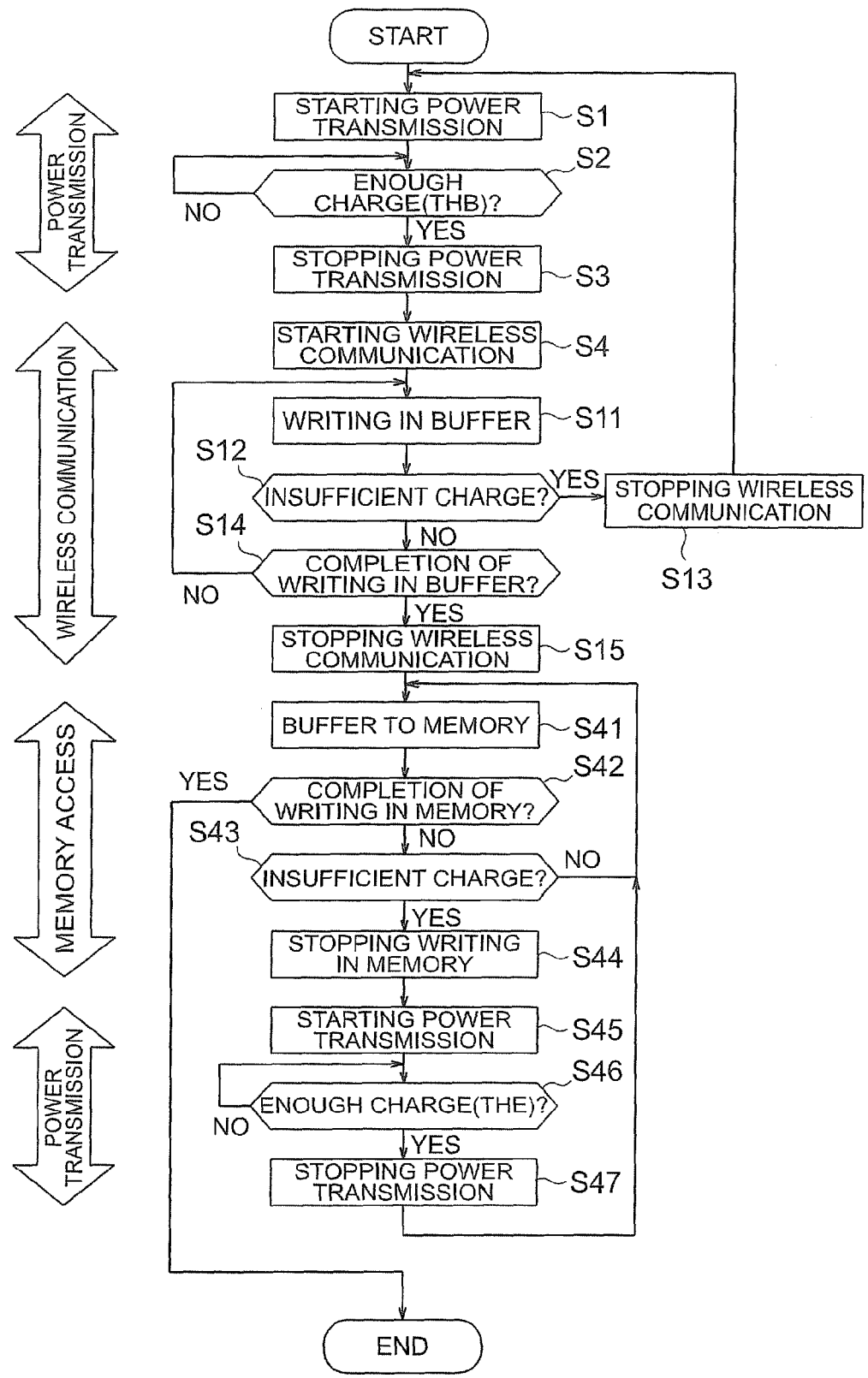

US 9,094,051 B2

POWER TRANSMITTER, POWER RECEIVER AND POWER TRANSMISSION AND RECEPTION SYSTEM

CROSS REFERENCE TO RELATED APPLICATIONS

This application is based upon and claims the benefit of priority from the prior Japanese Patent Application No. 2012-126071, filed on Jun. 1, 2012, the entire contents of which are incorporated herein by reference.

FIELD

Embodiments described herein relate generally to a power transmitter, a power receiver and a power transmission and reception system.

BACKGROUND

In recent years, a communication system is studied in which power is wirelessly supplied from a host to a memory card having no power supply and the memory card performs wireless communication with the host by using the supplied power. In such a system, since both the power supply and the communication are wirelessly performed, there is a problem that the communication tends to be unstable.

BRIEF DESCRIPTION OF THE DRAWINGS

FIG. 12 is a flowchart showing an example of a processing operation of the power transmission and reception system.

FIG. 14 is a flowchart showing an example of a processing operation of the power transmission and reception system.

DETAILED DESCRIPTION

In general, according to one embodiment, a power transmission and reception system includes a power transmitter and a power receiver. The power transmitter includes a power transmission module configured to wireless-transmit power to the power receiver; and a first wireless communication module configured to perform wireless communication of data frame having data with the power receiver. The power receiver includes a power reception module configured to receive the power transmitted from the power transmission module; and a second wireless communication module configured to perform wireless communication of the data frame with the first wireless communication module using the received power. The second wireless communication module is configured to perform wireless communication while the power reception module is not receiving the power.

Embodiments will now be explained with reference to the accompanying drawings.

First Embodiment

Figure 1:
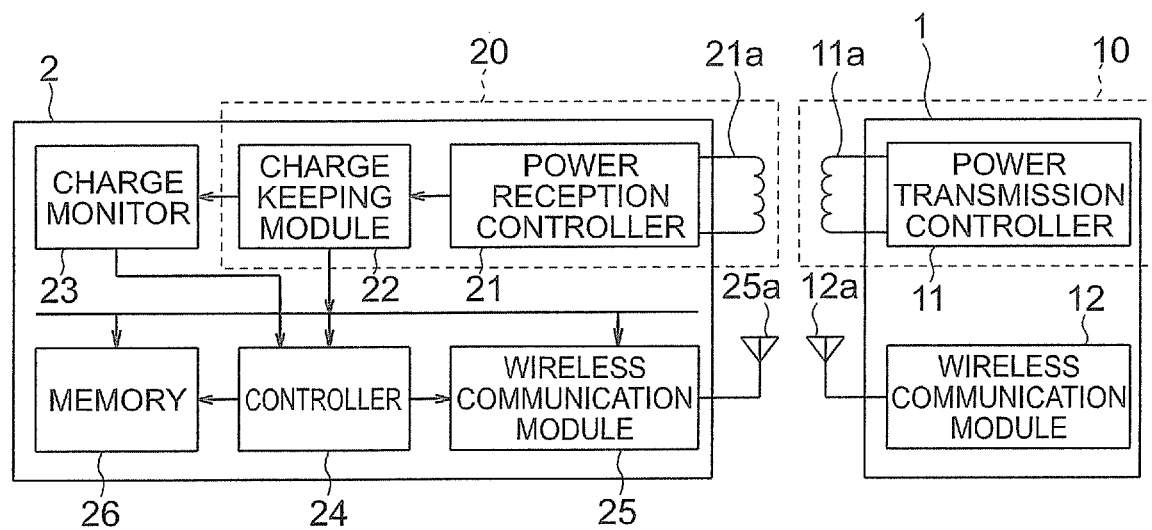
FIG. 1 is a block diagram showing a schematic configuration of a power transmission and reception system according to a first embodiment.

FIG. 1 is a block diagram showing a schematic configuration of a power transmission and reception system according to a first embodiment. The power transmission and reception system includes a power transmitter 1 and a power receiver 2. The power transmitter 1 has a coil 11a and an antenna 12a. The power receiver 2 has a coil 21a and an antenna 25a. The power transmitter 1 is a host, such as a mobile terminal device or a stationary terminal device, and has a relatively large power supply. The power receiver 2 is a so-called tag, such as a memory card which has no power supply or has a relatively small power supply. Therefore, the power receiver 2 operates by using power wirelessly transmitted from the power transmitter 1.

Wireless transmission of power is performed between the power transmitter 1 and the power receiver 2 by using the coils 11a and 21a. The frequency of an electric wave for power transmission is about tens of kHz to tens of MHz. For example, by setting the frequency of the electric wave for power transmission to be 13.56 MHz, the coils 11a and 21a can also be used as a coil for near field communication (NFC).

Wireless communication of data frame including data is performed between the power transmitter 1 and the power receiver 2. The frequency of the electric wave for power transmission is not so high, so that the electric wave for power transmission is not necessarily suited to wireless transmission of a relatively large amount of data frames. Therefore, wireless communication of data frame is performed by using the antennas 12a and 25a. The frequency of an electric wave for wireless communication is high. For example, an ultra wide band (UWB) of 2.4 GHz or 4.48 GHz is used.

As described above, the present embodiment has a configuration in which a power transmission means is different from a wireless communication means. Here, when the frequency of the electric wave for power transmission is 13.56 MHz, the 330th harmonic of the electric wave has a frequency of 4.474 GHz. Therefore, there is a possibility that the frequency of the harmonic overlaps the frequency of the electric wave for wireless communication, which may cause interference. When the interference occurs, communication speed of data frame may decrease. Therefore, the present embodiment intends to prevent the electric wave for power transmission and the electric wave for wireless communication from interfering with each other by performing the wireless transmission of power and the wireless communication of data frame exclusively from each other.

Hereinafter, a configuration of the power transmitter 1 and the power receiver 2 will be described in detail.

Figure 2:
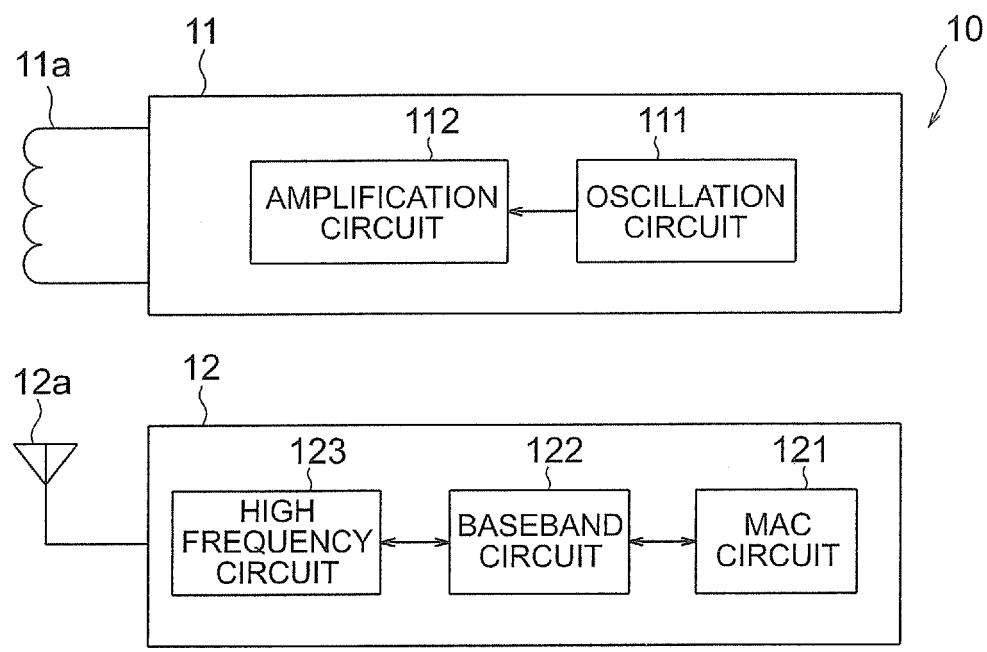
FIG. 2 is a block diagram showing an example of an internal configuration of the power transmitter 1.

FIG. 2 is a block diagram showing an example of an internal configuration of the power transmitter 1. The power transmitter 1 includes a power transmission controller 11, a coil 11a, a wireless communication module (first wireless communication module) 12, and an antenna 12a.

As shown in FIG. 2, the power transmission controller 11 includes an oscillation circuit 111 and an amplification circuit 112. The oscillation circuit 111 generates an oscillation signal for wirelessly transmitting power. The amplification circuit 112 amplifies the oscillation signal. The amplified oscillation signal is applied to the coil 11a, so that an electric wave for power transmission is transmitted. In this way, power is wirelessly transmitted from the power transmitter 1 to the power receiver 2. Note that the power transmission controller 11 and the coil 11a form a power transmission module 10.

The wireless communication module 12 is a circuit for performing high-speed wireless communication and includes a MAC (Media Access Control) circuit 121, a baseband circuit 122, and a high frequency circuit 123. The MAC circuit 121 performs protocol control on data. The baseband circuit 122 performs signal processing such as error correction, encoding processing, and modulation processing. The high frequency circuit 123 performs wireless communication of data frame by an ultra wide band wireless electric wave through the antenna 12a. Note that it is also possible to perform wireless communication by electromagnetic coupling using a coupler instead of the antenna 12a.

Figure 3:
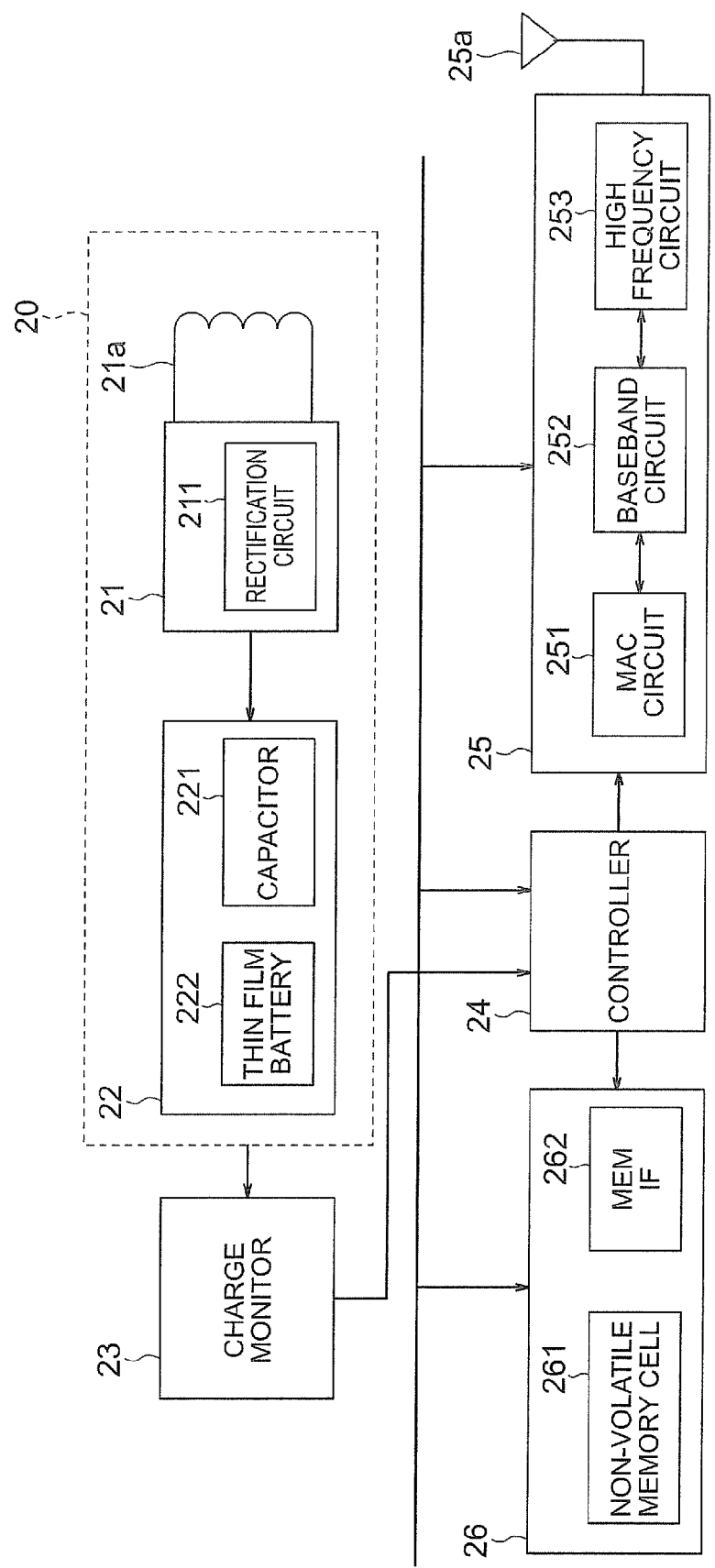
FIG. 3 is a block diagram showing an example of an internal configuration of the power receiver 2.

FIG. 3 is a block diagram showing an example of an internal configuration of the power receiver 2. The power receiver 2 includes a coil 21a, a power reception controller 21, a charge keeping module 22, a charge monitor 23, a controller 24, a wireless communication module (second wireless communication module) 25, an antenna 25a, and a memory 26.

When the coil 21a is disposed at a position near the coil 11a of the power transmitter 1 with a distance of several cm between them, a current corresponding to a current flowing in the coil 11a is generated in the coil 21a. This current flows into the power reception controller 21.

As shown in FIG. 3, the power reception controller 21 has, for example, a rectification circuit 211 including a rectification diode or the like, and converts the current flowing from the coil 21a into a direct current. The charge keeping module 22 has a capacitor 221 for keeping charge. Charge is accumulated in the capacitor 221 by the current converted by the power reception controller 21. The accumulated charge is used for processing operations in each component in the power receiver 2, such as, for example, wireless communication with the power transmitter 1 and access to the memory 26.

FIG. 3 shows an example in which power is converted into magnetic force or the like by the coil 11a and the coil 21a and the power is transmitted with an electromagnetic induction manner and a magnetic resonance manner in mind. Of course, the power transmission may be performed by antennas using a scheme such as an induction electric field manner in which power is transmitted by using electrodes or a power transmission manner using a radiated field.

Figure 4:
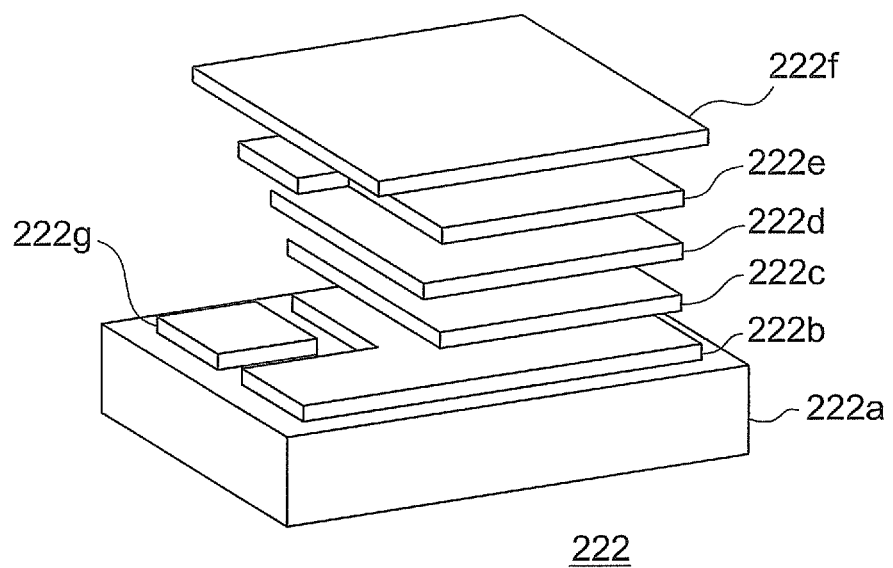
FIG. 4 is a perspective view showing a structure of the thin film battery 222.

The charge keeping module 22 may have a thin film battery 222 that can be charged by the transmitted power in addition to the capacitor 221. FIG. 4 is a perspective view showing a structure of the thin film battery 222. The thin film battery 222 includes a substrate 222a, a positive current collector 222b, a positive electrode 222c, a solid electrolyte 222d, a negative electrode 222e, a protective film 222f, and a negative current collector 222g. Since the solid electrolyte 222d is used, the thin film battery 222 has a safety even though being thin. The thin film battery 222 is a thin and light battery, which has, for example, a capacity of 1 to 10 mA/h, a thickness of 100 to 300 μm in one square inch, and a weight of 0.1 to 0.2 g. By providing such a thin and light battery in the power receiver 2, it is possible to operate the power receiver 2 more stably.

Returning to FIG. 3, the charge monitor 23 monitors a state of the power reception controller 21, in particular, the amount of charge accumulated in the charge keeping module 22. The monitoring manner is not limited. For example, since the voltage outputted from the capacitor 221 varies according to the amount of charge, it is possible to monitor the amount of charge through the voltage outputted from the capacitor 221. Also it is possible to monitor the amount of current flowing into the charge keeping module 22 or a time variation of the amount of current. The charge monitor 23 detects a power transmission state based on the amount of accumulated charge and the like and notifies the controller 24 of the power transmission state.

The controller 24 controls the wireless communication module 25 and the memory 26 on the basis of the notification from the charge monitor 23. More specifically, the controller 24 controls timing at which the wireless communication module 25 performs wireless communication and timing at which a power reception module 20 performs wireless power reception and performs access to the memory 26.

The wireless communication module 25 is similar to the wireless communication module 12 of the power transmitter 1. Data received from the power transmitter 1 may be demodulated for a display device (not shown in the drawings) to be displayed.

The memory 26 includes a non-volatile memory cell 261 such as a NAND type flash memory or an MRAM (Magnetic Random Access Memory), and a memory interface (MEM IF) 262. Data is read from and/or written to the non-volatile memory cell 261 by the controller 24 through the memory interface 262.

It is assumed that the power receiver 2 of the present embodiment operates using the power wirelessly transmitted from the power transmitter 1, so that a non-volatile memory is used. If power is supplied from a battery or the like in the power receiver 2, a volatile memory such as a SRAM (Static Random Access Memory) or a DRAM (Dynamic Random Access Memory) may be used.

In this way, the power transmission and the data communication are performed wirelessly, and thus, the power transmitter 1 can access the memory 26 of the power receiver 2 without contact. Therefore, electrical terminals are not required for the power receiver 2, thereby, improving the degree of freedom in design and the waterproof property.

Next, a processing operation of the power transmission and reception system in FIG. 1 will be described.

Figure 5:
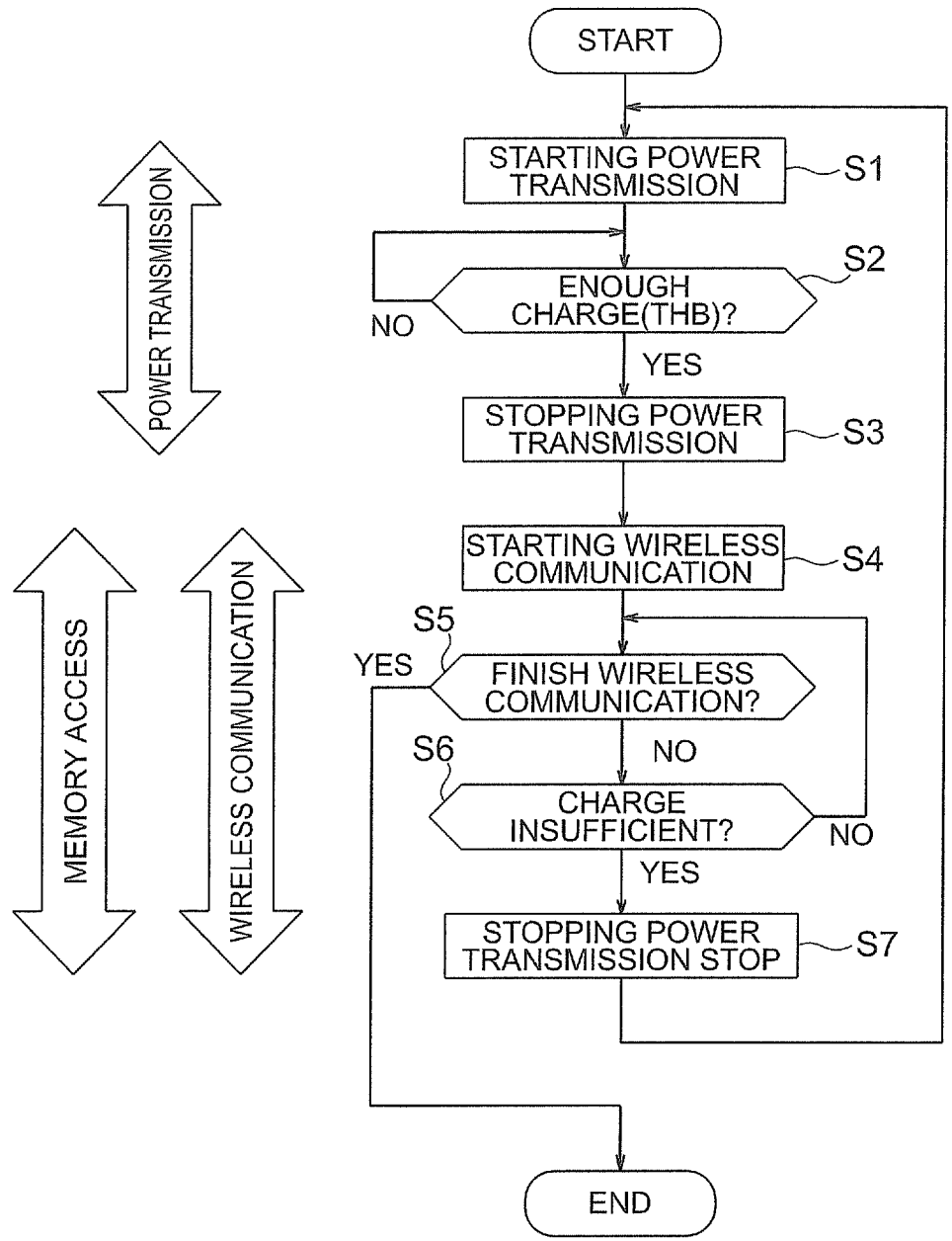
FIG. 5 is a flowchart showing an outline of the processing operation of the power transmission and reception system in FIG. 1.

FIG. 5 is a flowchart showing an outline of the processing operation of the power transmission and reception system in FIG. 1. First, the power transmission module 10 of the power transmitter 1 starts wireless power transmission to the power reception module 20 of the power receiver 2. Accordingly, the power reception module 20 receives power and charge is accumulated in the charge keeping module 22 (step S1).

When the amount of charge (THB, described later in detail) necessary to perform wireless communication between the power transmitter 1 and the power receiver 2 is accumulated in the charge keeping module 22 (YES in step S2), the controller 24 stops the wireless power transmission (step S3).

At a state where the wireless power transmission is stopped, the controller 24 starts wireless communication of data frame between the wireless communication module 12 of the power transmitter 1 and the wireless communication module 25 of the power receiver 2 (step S4). In the present embodiment, it is assumed that while the wireless communication is performed, the controller 24 accesses the memory 26. When the wireless communication is finished (YES in step S5), the processing operation of the power transmission and reception system is ended.

As long as the charge necessary to perform wireless communication is accumulated in the charge keeping module 22, the wireless communication module 25 of the power receiver 2 continues the wireless communication with the power transmitter 1 (NO in step S6). However, while the wireless communication is performed, if the charge accumulated in the charge keeping module 22 is consumed and reduced by the wireless communication module 25 or the memory 26, and the wireless communication becomes difficult to be continued (YES in step S6), the controller 24 temporarily stops the wireless communication (step S7). Then, at a state where the wireless communication is stopped, the controller 24 starts wireless power transmission from the power transmitter 1 to the power receiver 2 to accumulate the charge again (step S1). The processing operation described above is performed until the wireless communication is finished.

In this way, by performing the transmission of power and the transmission of data frame exclusively from each other, it is possible to prevent the electric wave for power transmission and the electric wave for wireless communication from interfering with each other.

Figure 6:
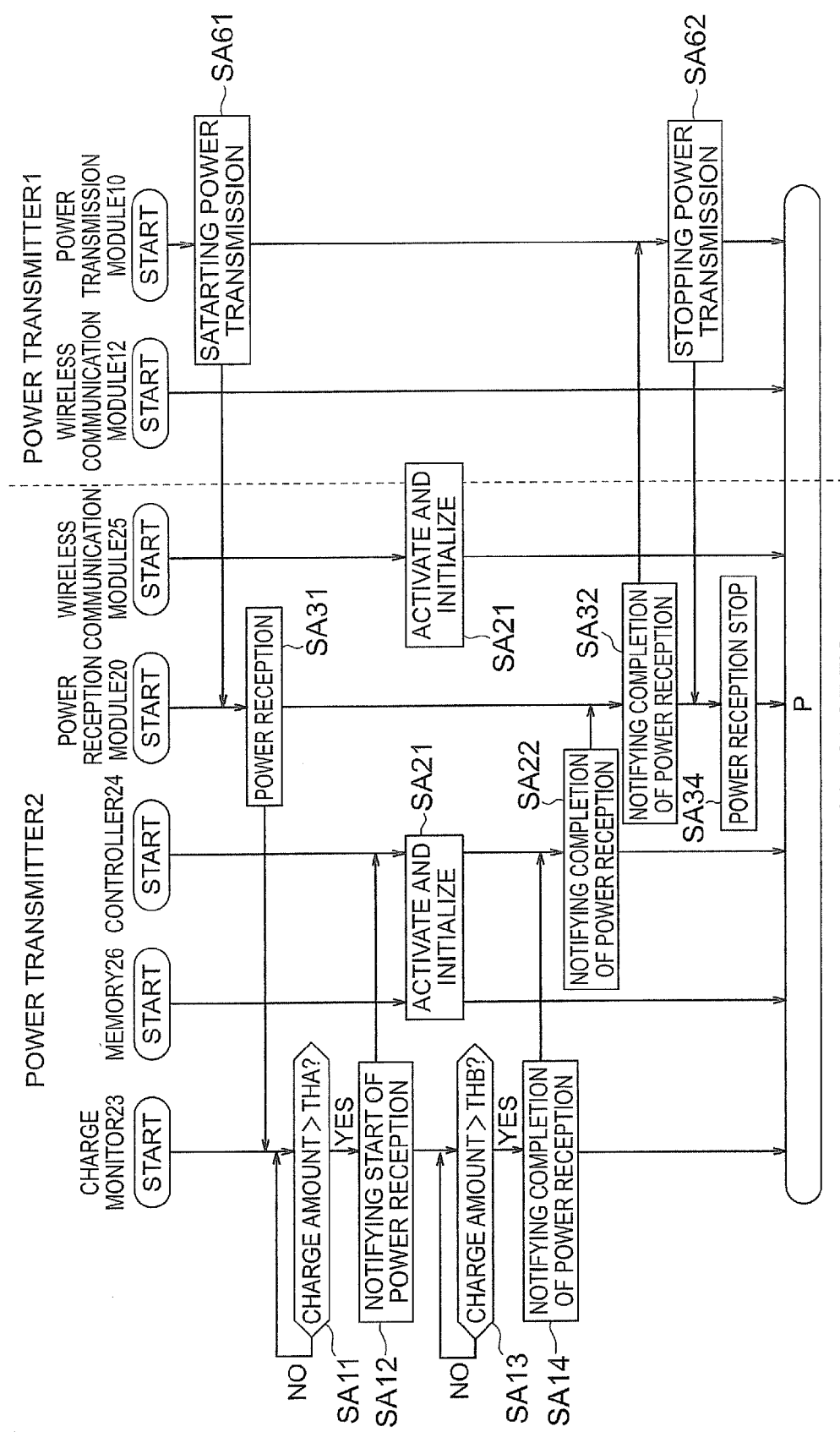
FIG. 6 is a sequence diagram showing steps S1 to S3 in FIG. 5.

FIG. 6 is a sequence diagram showing steps S1 to S3 in FIG. 5, that is, a power transmission process. The processing operation of the power transmission and reception system will be described in detail with reference to FIG. 6.

First, the power transmission module 10 of the power transmitter 1 starts power transmission (step SA61). For example, if the power transmitter 1 is a mobile terminal device driven by a battery, it is possible to configure so that the power transmitter 1 explicitly notifies the power receiver 2 of the start of the power transmission. Or, when the power transmitter 1 is a stationary terminal device to which power is supplied from an electric outlet, it is possible to configure so that the power transmission state is constantly or periodically maintained. In the present embodiment, one of the configurations described as an example or another configuration may be used.

By the power transmission from the power transmitter 1, the power reception module 20 of the power receiver 2 starts power reception (step SA31). More specifically, the coil 21a of the power receiver 2 approaches the coil 11a of the power transmitter 1, so that the power reception controller 21 becomes in a power reception state and starts generating current. Accordingly, charge is accumulated in the charge keeping module 22.

The charge monitor 23 monitors the amount of charge accumulated in the charge keeping module 22. When the amount of charge exceeds a predetermined threshold value THA (YES in step SA11), the charge monitor 23 notifies the controller 24 that the power reception is started (step SA12). Accordingly, the controller 24 activates the controller 24 itself, the wireless communication module 25, and the memory 26, and then, performs power-on initialization control, which is called "power-on reset" (step SA21). The initialization control includes, for example, resetting various registers, loading data from the memory 26, and booting an operating system on a processor. Here, the threshold value THA corresponds to a sufficient amount of charge to perform the initialization control of each component. By performing the initialization control in advance, preparation of communication can be done in an early stage.

When the amount of charge accumulated in the charge keeping module 22 further exceeds a threshold value THB (YES in step SA13), the charge monitor 23 notifies the controller 24 that the power reception is completed (step SA14). The completion of the power reception means that it is possible to start wireless communication. The completion of the power reception is notified to the power transmission module 10 of the power transmitter 1 through the power reception module 20 (steps SA22 and SA32).

In the present embodiment, the completion of the power reception is notified from the power reception module 20 to the power transmission module 10 without performing wireless communication. In order to do that, for example, the controller 24 changes a load resistance of the coil 21a and the power transmission module 10 detects the change of the load resistance.

Here, the threshold value THB corresponds to a sufficient amount of charge for the wireless communication module 25 to perform wireless communication. More specifically, the amount of charge when the following formula (1) is satisfied is defined as the threshold value THB.

$$P*T = p*t + Em \quad (1)$$

Here, P is effective transmission power which is wirelessly transmitted, T is wireless transmission time of power, p is effective power consumption when wireless communication is performed, t is wireless communication time, and Em is energy required to access the memory 26.

The threshold value THB may be adjusted according to a state of the electric wave of the wireless communication. For example, when the state of the electric wave is bad, it is desired that the threshold value THB is set to high. Thereby, even if re-transmission due to data error occurs often when the wireless communication is performed, it is possible to prevent the charge from being insufficient.

Also, the threshold value THB may be adjusted according to the amount of current flowing from the power reception controller 21 to the charge keeping module 22 or a time variation (differential value) of the amount of current. For example, when the amount of current is small, the power supply is small, so that it is desired that the threshold value THB is set to high. Also, when the time variation of the amount of current is large, it is highly possible that the power supply is unstable, so that it is desired that the threshold value THB is set to high. In each case, it is possible to access the memory more stably by starting communication after accumulating a certain amount of charge.

When the power transmission module 10 receives a power reception completion notice, the power transmission module 10 stops power transmission (step SA62). Accordingly, the power reception module 20 stops power reception (step SA34).

As known from FIG. 6, while the power transmission is performed between the power transmission module 10 and the power reception module 20, the wireless communication of data frame is not performed between the wireless communication module 12 and the wireless communication module 25.

Figure 7:
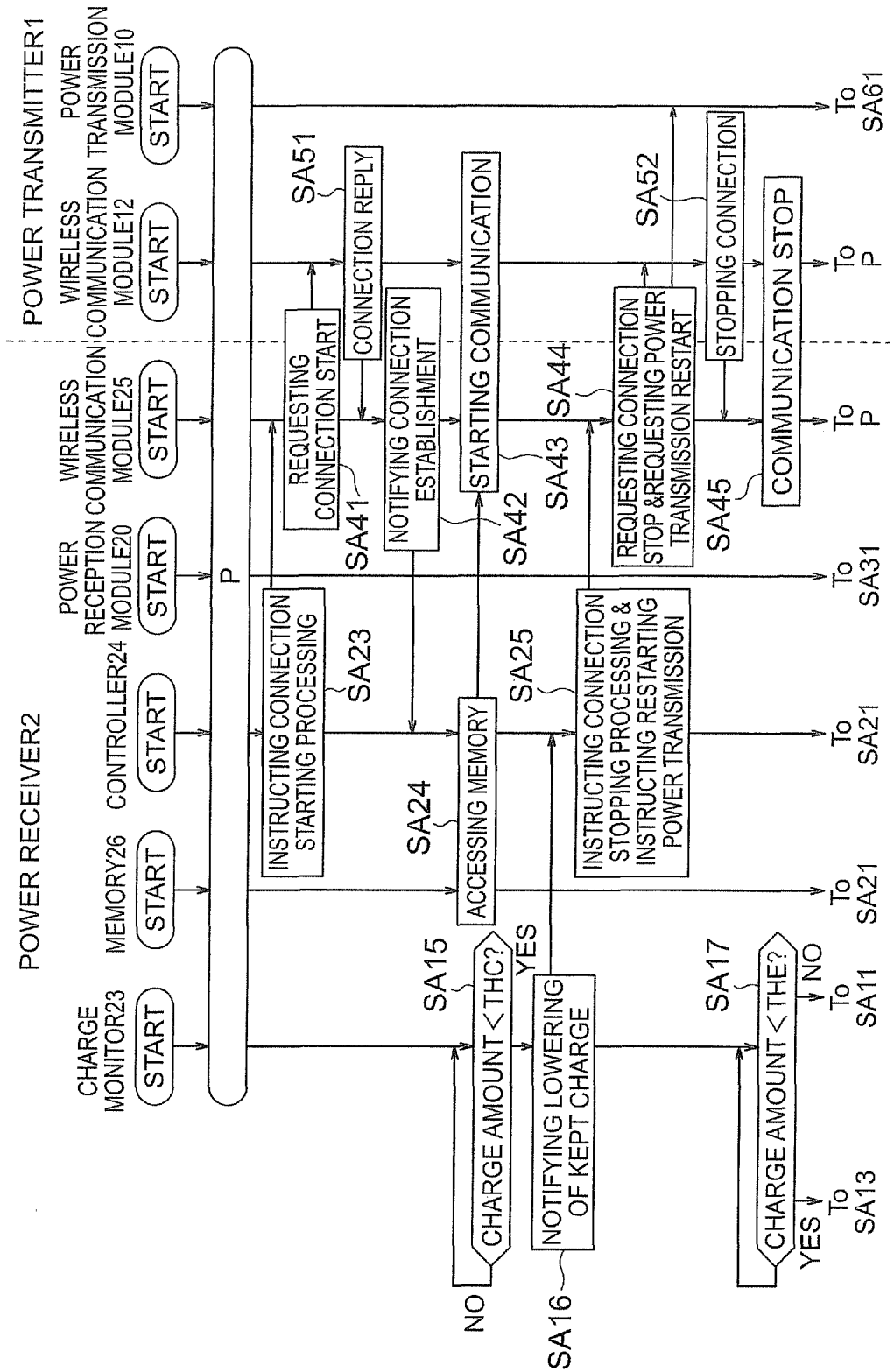
FIG. 7 is a sequence diagram showing steps S4 to S7 in FIG. 5.

FIG. 7 is a sequence diagram showing steps S4 to S7 in FIG. 5, that is, a wireless communication process, which is continued from FIG. 6. The processing operation of the power transmission and reception system will be described in detail with reference to FIG. 7.

After the power transmission from the power transmitter 1 is stopped, the controller 24 of the power receiver 2 instructs the wireless communication module 25 to perform connection starting processing (step SA23). In response to this, the wireless communication module 25 transmits a connection start request signal to the power transmitter 1 (step SA41). The wireless communication module 12 of the power transmitter 1 recognizes that the power receiver 2 is ready to perform wireless communication and transmits a connection reply signal to the power receiver 2 (step SA51). When the wireless communication module 25 of the power receiver 2 receives the connection reply signal, the wireless communication module 25 notifies the controller 24 that the connection with the power receiver 2 is established (step SA42).

Although not shown in the drawings, after the connection establishment is notified, it is possible to perform authentication processing, exchange of terminal information, checking of capability (what functions are included), processing necessary for encrypting data to conceal data communication, and the like between the power transmitter 1 and the power receiver 2.

When the connection is established in this way, wireless communication is started between the wireless communication module 12 of the power transmitter 1 and the wireless communication module 25 of the power receiver 2 (step SA43). While performing the wireless communication, the controller 24 accesses the memory 26 (step SA24).

As the wireless communication, an example will be described in which data is read from the memory 26 of the power receiver 2 according to a request from the power transmitter 1 and the data is transferred to the power transmitter 1. First, the wireless communication module 12 of the power transmitter 1 transmits a data read request to the power receiver 2. In the data read request, for example, a read address of the memory 26 may be specified or a set of a read start address and a data length may be specified. Also, a plurality of the sets may be specified. When data is read as a file, a path of the folder and a file name may be specified.

The wireless communication module 25 of the power receiver 2 which receives the data read request notifies the controller 24 of the data read request. The controller 24 reads data corresponding to the data read request from the memory 26. The read data is transmitted from the wireless communication module 25 to the power receiver 2 as a data frame. Data may be read and transmitted a plurality of times in response to one data read request.

Or, as wireless communication, in response to a request from the power transmitter 1, data frame is transmitted from the power transmitter 1 to the power receiver 2 and the data may be written to the memory 26 in the power receiver 2. In the present embodiment, when data is read from the memory 26 and also when data is written to the memory 26, the controller 24 accesses the memory 26 while the wireless communication module 25 performs wireless communication.

When performing the wireless communication or accessing the memory 26, the charge accumulated in the charge keeping module 22 is used. Therefore, the charge is gradually consumed and reduced. If the amount of the charge falls below a threshold value THC while wireless communication is performed (YES in step SA15), it becomes difficult to perform the wireless communication and to access the memory 26. Therefore, the charge monitor 23 notifies the controller 24 that the amount of the accumulated charge has decreased. Then, the controller 24 performs termination processing which saves a data frame being transferred without damaging the data frame, and instructs the wireless communication module 25 to perform connection stopping processing and restart power transmission (step SA25). In response to this, the wireless communication module 25 transmits a connection stop request signal and a power transmission restart request signal to the power transmitter 1 (step SA44).

When the wireless communication module 12 of the power transmitter 1 receives the connection stop request signal, the wireless communication module 12 stops the connection and transmits a connection stop signal to the power receiver 2 (step SA52). Thereby, the wireless communication between the power transmitter 1 and the power receiver 2 stops (step SA45). On the other hand, when the power transmission module 10 of the power transmitter 1 receives the power transmission restart request signal, the power transmission module 10 restarts the power transmission (step SA61 in FIG. 4).

Here, the threshold value THC corresponds to the amount of charge necessary to perform the termination processing and necessary for the wireless communication module 25 to transmit the connection stop request signal and the power transmission restart request signal to the power transmitter 1.

When the wireless communication module 25 transmits the connection stop request signal and the power transmission restart request signal to the power transmitter 1, the amount of charge accumulated in the charge keeping module 22 is further reduced. As a result, if the amount of charge is equal to or less than the threshold value THA (NO in step SA17), the power receiver 2 returns to the state in step SA11 in FIG. 6. On the other hand, if the amount of charge is greater than the threshold value THA but equal to or less than the threshold value THB (YES in step SA17), the power receiver 2 returns to the state in step SA13 in FIG. 6.

The above process is repeatedly performed until the wireless communication is finished. As known from FIG. 7, while the wireless communication of data frame is performed between the wireless communication module 12 and the wireless communication module 25, the power transmission is not performed between the power transmission module 10 and the power reception module 20.

Figure 8A:
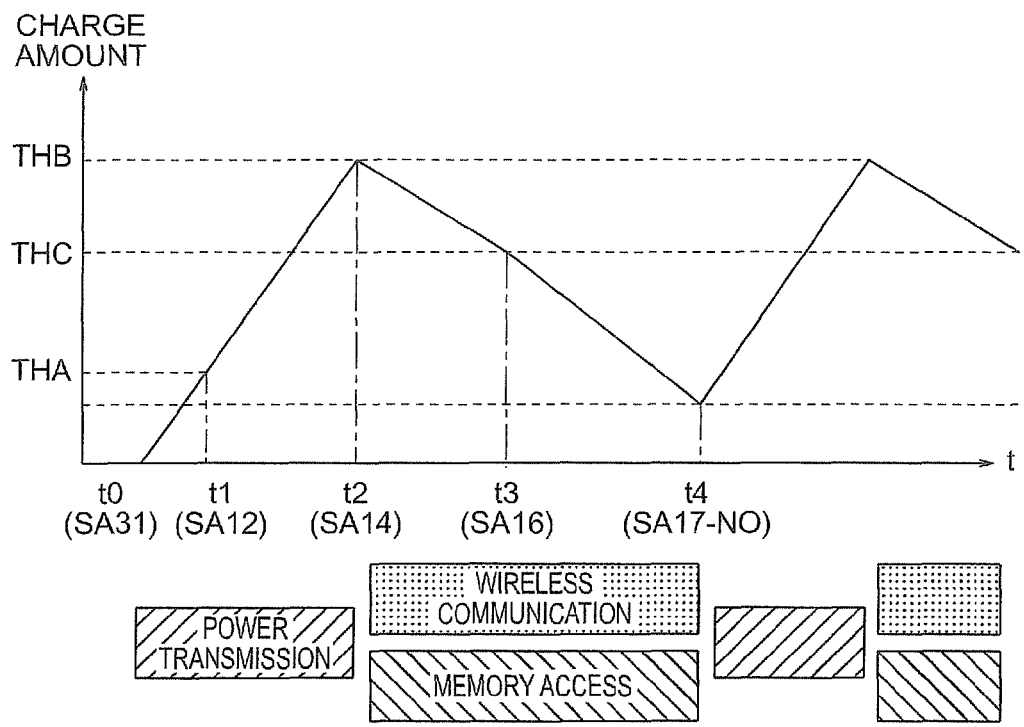
FIGS. 8A and 8B are diagrams schematically showing a relationship between the amount of charge accumulated in the charge keeping module 22 and a processing operation of the power transmission and reception system.
Figure 8B:
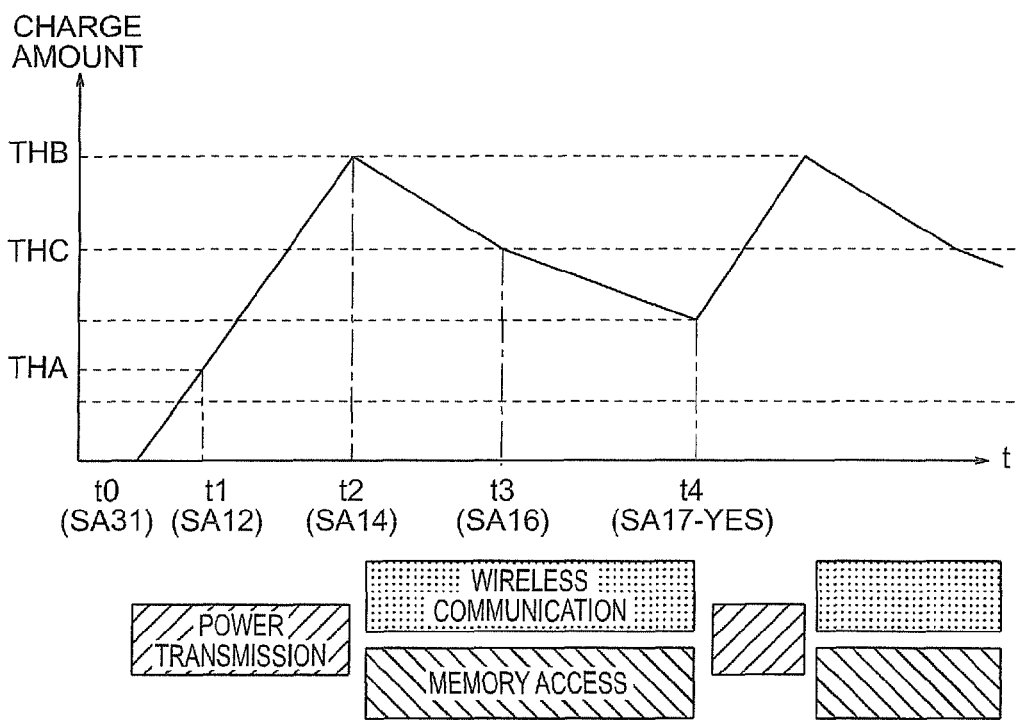

FIGS. 8A and 8B are diagrams schematically showing a relationship between the amount of charge accumulated in the charge keeping module 22 and a processing operation of the power transmission and reception system. In the graph of FIG. 8, the horizontal axis represents time and the vertical axis represents the amount of charge.

When the power reception is started at a time t0, the amount of charge gradually increases (step SA31 in FIG. 6). When the amount of charge reaches the threshold value THA at a time t1, the start of the power reception is detected by the charge monitor 23 (step SA12 in FIG. 6). Further, when the amount of charge reaches the threshold value THB at a time t2, the completion of the power reception is detected by the charge monitor 23 (step SA14 in FIG. 6). The wireless transmission of power is performed during the period of time between the time t0 and the time t2.

When the power reception is completed, the wireless communication is performed and the memory 26 is accessed (steps SA43 and SA24 in FIG. 7). When the amount of charge decreases and falls below the threshold value THC at a time t3, the lowering of the accumulated charge is detected by the charge monitor 23 (step SA16 in FIG. 7). At a time t4, the connection stopping processing and the power transmission restart instruction by the controller 24 are completed, and the wireless communication and the memory access stop. In other words, the wireless communication and the memory access are performed during the period of time between the time t2 and the time t4, in which the power transmission is not performed.

Thereafter, a processing operation depending on whether the amount of charge at the time t4 is equal to or less than the threshold value THA (NO in step SA17 in FIG. 7, FIG. 8A) or greater than the threshold value THA (YES in step SA17 in FIG. 7, FIG. 8B) is performed.

As described above, in the first embodiment, the data frame is transmitted by the wireless communication means which is different from the power transmission means. Therefore, the data frame can be transmitted at high speed between the power transmitter 1 and the power receiver 2. Since the communication is performed when the power is not transmitted, it is possible to prevent the electric wave for power transmission and the electric wave for wireless communication from interfering with each other, thereby, performing the data communication stably. Further, it is possible to reduce performance degradation of analog circuits in the wireless communication modules 12 and 25 due to noise to the power supply and the ground caused by the power transmission.

Second Embodiment

In the first embodiment described above, while the wireless communication is performed, the memory 26 is accessed. On the other hand, in a second embodiment described below, the wireless communication and the memory access are performed at different timing and the memory access is performed while the wireless transmission of power is performed.

Figure 9:
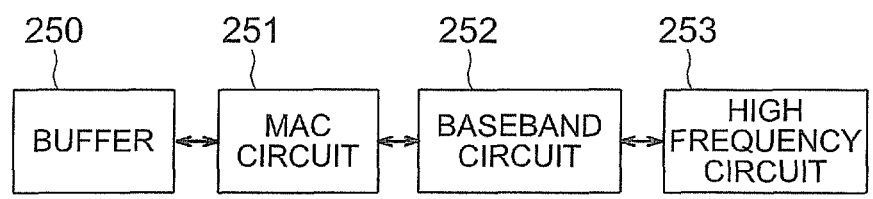
FIG. 9 is a block diagram showing an example of an internal configuration of a wireless communication module 25' of a power receiver 2 in a power transmission and reception system according to a second embodiment.

FIG. 9 is a block diagram showing an example of an internal configuration of a wireless communication module 25' of a power receiver 2 in a power transmission and reception system according to a second embodiment. The wireless communication module 25' in FIG. 9 includes a buffer 250 where data is read and written in addition to the components in the wireless communication module 25 in FIG. 3. Although the buffer 250 is volatile, the access speed of the buffer 250 is faster than that of the non-volatile memory 26 and the power consumption of the buffer 250 is smaller than that of the non-volatile memory 26.

When the memory 26 is accessed, a relatively large power is consumed. Since this power is supplied from the charge accumulated in the charge keeping module 22, so that it is desirable that the power consumption while the power transmission is not performed is reduced as much as possible.

Therefore, in the present embodiment, while the wireless communication is performed, that is, while the power transmission is not performed, the memory 26 is not accessed and the buffer 250 is temporarily used. On the other hand, while the wireless communication is not performed, that is, while the power transmission is performed, data is transferred between the buffer 250 and the memory 26.

Figure 10:
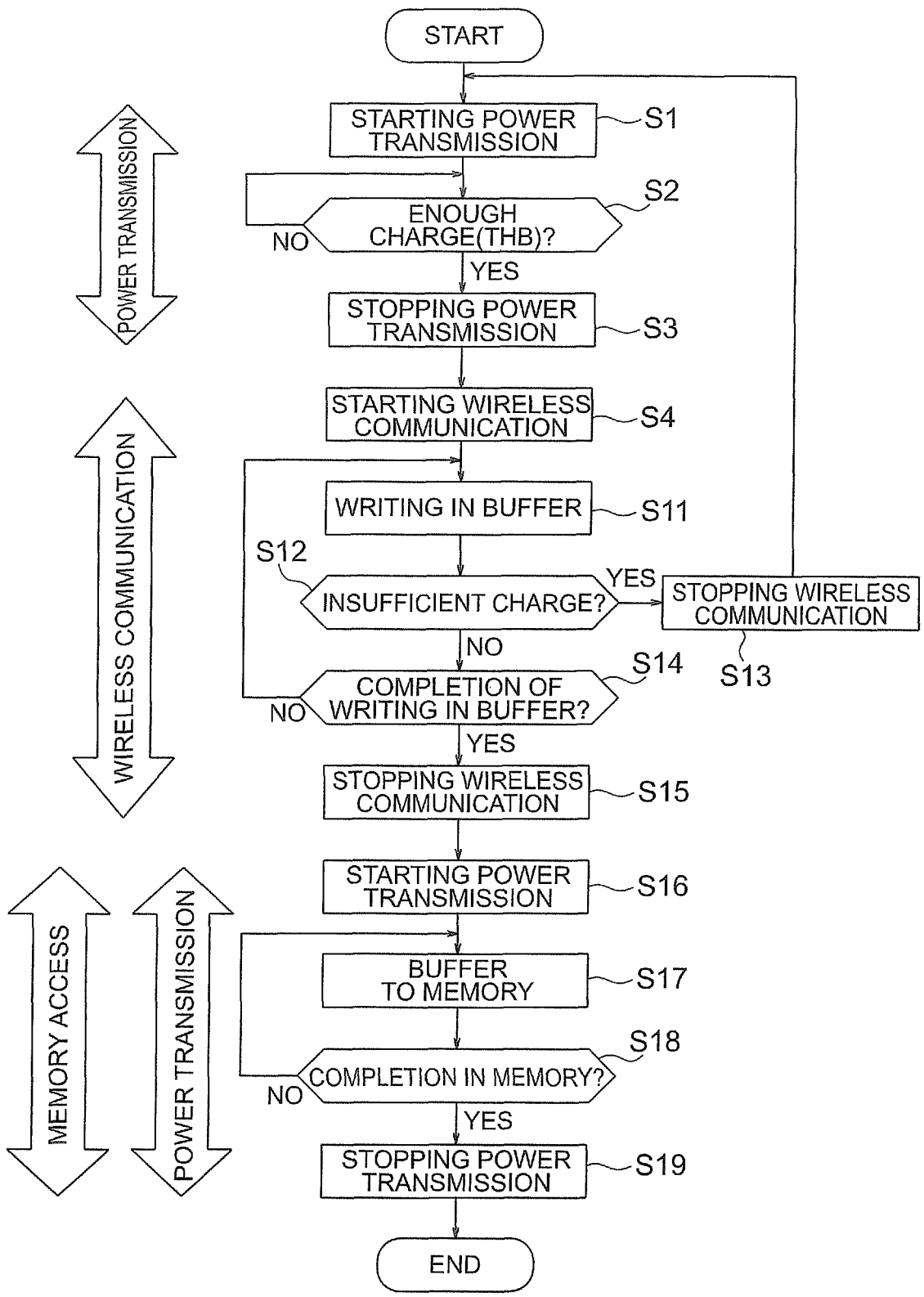
FIG. 10 is a flowchart showing an example of a processing operation of the power transmission and reception system.

FIG. 10 is a flowchart showing an example of a processing operation of the power transmission and reception system when a data frame is transmitted from the power transmitter 1 to the power receiver 2 and the data frame is written to the memory 26. Since steps S1 to S4 are the same as those in FIG. 5, the description thereof will be omitted. The processes described in detail with reference to FIGS. 6 and 7 in the first embodiment will be described in a simplified manner.

When the wireless communication is started (step S4), data that should be written to the memory 26 is transmitted from the wireless communication module 12 of the power transmitter 1 to the wireless communication module 25 of the power receiver 2. The wireless communication module 25 receives the data and writes the data to the buffer 250 (step S11). The data is written to the buffer 250 instead of the memory 26, so that it is possible to reduce power consumption and suppress consumption of the charge accumulated in the charge keeping module 22.

When the amount of charge becomes insufficient while the data is being written to the buffer 250, and the charge monitor 23 determines that it is difficult to perform wireless communication and to write the data to the buffer 250 (YES in step S12), the controller 24 temporarily stops the wireless communication (step S13), performs sufficient power transmission again, and then restarts the wireless communication (steps S1 to S4). The power transmission and reception system performs the above processing operation until the writing operation to the buffer 250 is completed.

When the writing operation to the buffer 250 is completed (YES in step S14), the controller 24 stops the wireless communication (step S15) and starts the power transmission (step S16). In a state where the power transmission is performed, the controller 24 reads the data which is transmitted from the power transmitter 1 and written to the buffer 250 in step s11 and writes the read data to the memory 26 (step S17). In other words, the memory 26 is not accessed until the power transmission is started. Although a relatively large power is consumed to access the memory 26, it is possible to avoid power shortage by accessing the memory while performing the power transmission.

Thereafter, when the writing operation to the memory 26 is completed (YES in step S18), the controller 24 stops the power transmission (step S19). Of course, the transmission of data frame from the power transmitter 1 to the power receiver 2 may be continued.

Figure 11:
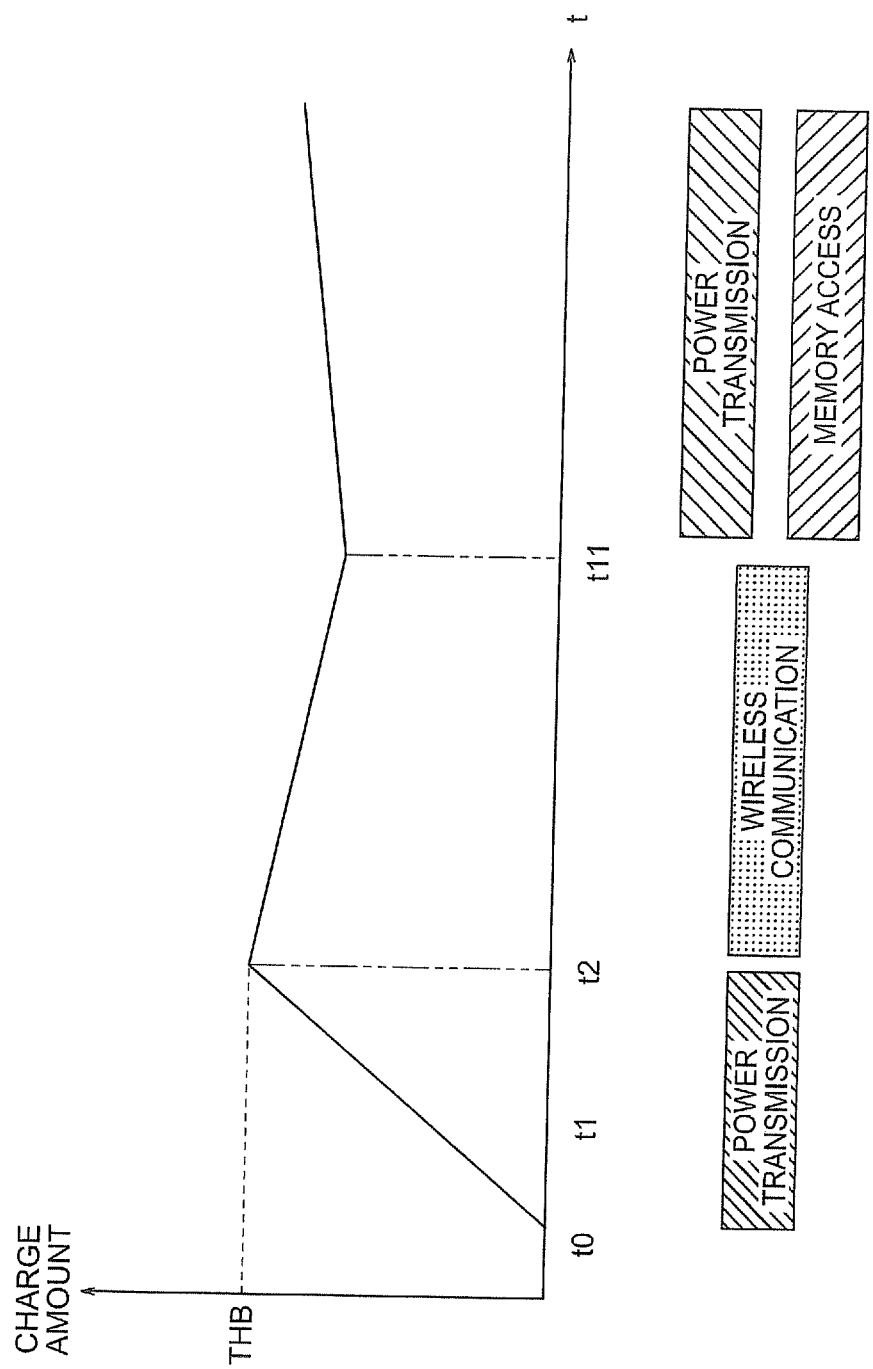
FIG. 11 is a diagram schematically showing a relationship between the amount of charge accumulated in the charge keeping module 22 and a processing operation of the power transmission and reception system.

FIG. 11 is a diagram schematically showing a relationship between the amount of charge accumulated in the charge keeping module 22 and a processing operation of the power transmission and reception system. In the graph of FIG. 11, the horizontal axis represents time and the vertical axis represents the amount of charge.

The graph from times t0 to t2 is substantially the same as that in FIG. 8. However, the threshold value THB for starting the wireless communication in FIG. 11 may be lower than the threshold value THB in FIG. 8. This is because, although the amount of charge to perform both the wireless communication and the memory access is required by using the accumulated charge in the case of FIG. 8, the amount of charge to perform only the wireless communication is required in the case of FIG. 11. In the time period between a time t2 and a time t11, the wireless communication is performed, while the memory access is not performed. Therefore, the charge reduces slower than the case of FIG. 8.

Thereafter, when the writing operation to the buffer 250 is completed at time t11 the wireless communication is stopped and the power transmission is started (steps S15 and S16 in FIG. 10). In a state where the power transmission is performed, the controller 24 performs the memory access (step S17 in FIG. 10).

The processing operation has been described in which a data frame is transmitted from the power transmitter 1 to the power receiver 2 and the data frame is written to the memory 26. Next, in an opposite manner, a processing operation in which data is read from the memory 26 of the power receiver 2 and the data is transmitted to the power transmitter 1 will be described.

FIG. 12 is a flowchart showing an example of a processing operation of the power transmission and reception system when data is read from the memory 26 of the power receiver 2 and a data frame is transferred to the power transmitter 1. It is assumed that wireless communication was performed before the processing of FIG. 12 and which data will be read from data stored in the memory 26 and will be transmitted to the power transmitter 1 has been notified from the power transmitter 1 to the power receiver 2.

When the power transmission is started (step S31), the controller 24 reads the data which should be transmitted to the power receiver 2 from the memory 26 and temporarily stores the data in the buffer 250 (step S32). In other words, also in FIG. 12, while the power transmission is performed, the memory 26 is accessed.

When the reading operation from the memory 26 and the writing operation to the buffer 250 are completed and the amount of charge necessary to perform the wireless communication is accumulated (YES in step S33), the controller 24 stops the power transmission (step S34). In other words, even when the amount of charge necessary to perform the wireless communication is accumulated, the power transmission is continued until the reading operation from the memory 26 is completed.

After the power transmission is stopped, the wireless communication is started (step S35). More specifically, the wireless communication module 25 reads the data written in the buffer 250 and transmits the data as a data frame to the power transmitter 1. The following processing operation is the same as that of the steps S5 to S7 and steps S1 and S2.

Figure 13A:
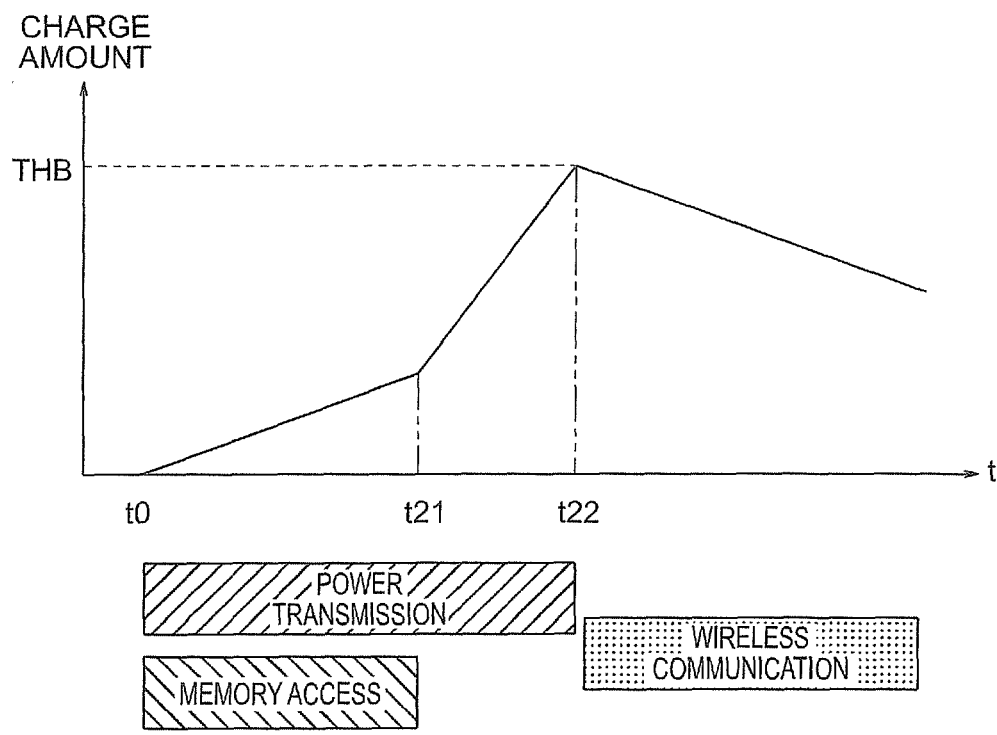
FIGS. 13A and 13B are diagrams schematically showing a relationship between the amount of charge accumulated in the charge keeping module 22 and a processing operation of the power transmission and reception system.
Figure 13B:
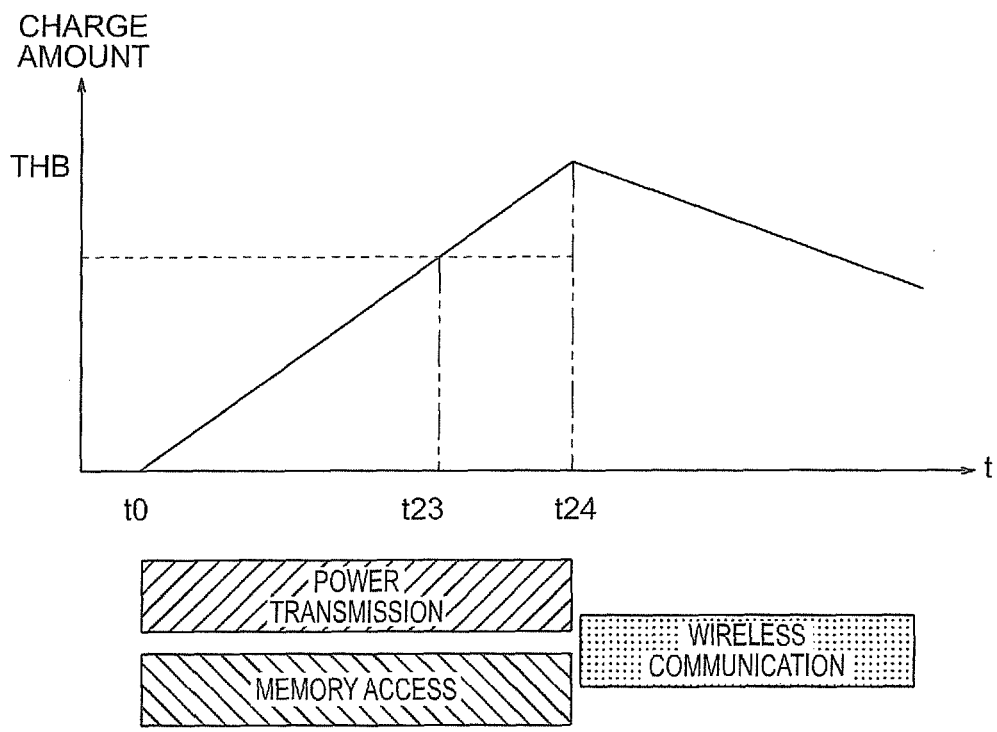

FIGS. 13A and 13B are diagrams schematically showing a relationship between the amount of charge accumulated in the charge keeping module 22 and a processing operation of the power transmission and reception system. In the graph of FIG. 13, the horizontal axis represents time and the vertical axis represents the amount of charge. In the case of FIG. 12, the power transmission is stopped after the reading operation from the memory 26 is completed and the amount of charge sufficient to perform the wireless communication is accumulated (step S33). Considering this point, there may be two types of operations shown in FIGS. 13A and 13B.

In FIG. 13A, although the reading operation from the memory 26 is completed at a time t21, at this time point, a sufficient amount of charge (THB) has not yet been accumulated. Therefore, the power transmission is continued, and the wireless communication is started after a time t22 at which the sufficient amount of charge is accumulated.

On the other hand, in FIG. 13B, although a sufficient amount of charge (THB) is accumulated at a time t23, at this time point, the reading operation from the memory 26 has not yet been completed. Therefore, while the power is still being transmitted, the reading operation from the memory 26 is performed, and the wireless communication is started after a time t24 at which the reading operation is completed.

In this way, in the second embodiment, the memory access, which consumes a large amount of power, is performed while the power is being transmitted. Therefore, it is possible to reduce the power consumption when the power transmission is not performed, that is, when the wireless communication is performed. As a result, the peak of the power consumption is reduced and the scale of the circuit for transmitting power can be small.

Third Embodiment

In the second embodiment described above, while the power is transmitted, the memory access is performed. On the other hand, in a third embodiment described below, three operations, that is, the power transmission, the wireless communication, and the memory access, are performed exclusively from each other. Hereinafter, the difference from the second embodiment will be mainly described.

FIG. 14 is a flowchart showing an example of a processing operation of the power transmission and reception system when a data frame is transmitted from the power transmitter 1 to the power receiver 2 and the data frame is written to the memory 26. Steps S1 to S15 are the same as those in FIG. 10.

When all data in a data frame transmitted from the power transmitter 1 to the power receiver 2 is written to the buffer 250 (YES in step S14), the wireless communication is stopped (step S15). Thereafter, the controller 24 of the power receiver 2 reads the data written to the buffer 250 and writes the data to the memory 26 (step S41) without restarting the power transmission.

Before the writing operation to the memory 26 is completed (NO in step S42), if the charge for the memory access becomes insufficient (YES in step S43), the controller 24 stops the writing operation to the memory 26 (step S44) and restarts the power transmission (step S45). When the charge monitor 23 detects that a sufficient amount of charge (THE) to perform the memory access is accumulated (YES in step S46), the controller 24 stops the power transmission (step S47) and restarts the writing operation to the memory 26 (step S41).

The processing operation described above is performed until the writing operation to the memory 26 is completed (YES in step S42). It is possible to repeatedly perform the transmission of the data frame from the power transmitter 1 to the power receiver 2 (steps S4 to S15) and the writing operation from the buffer 250 to the memory 26 in the power receiver 2 (steps S41 and S42).

Figure 15:
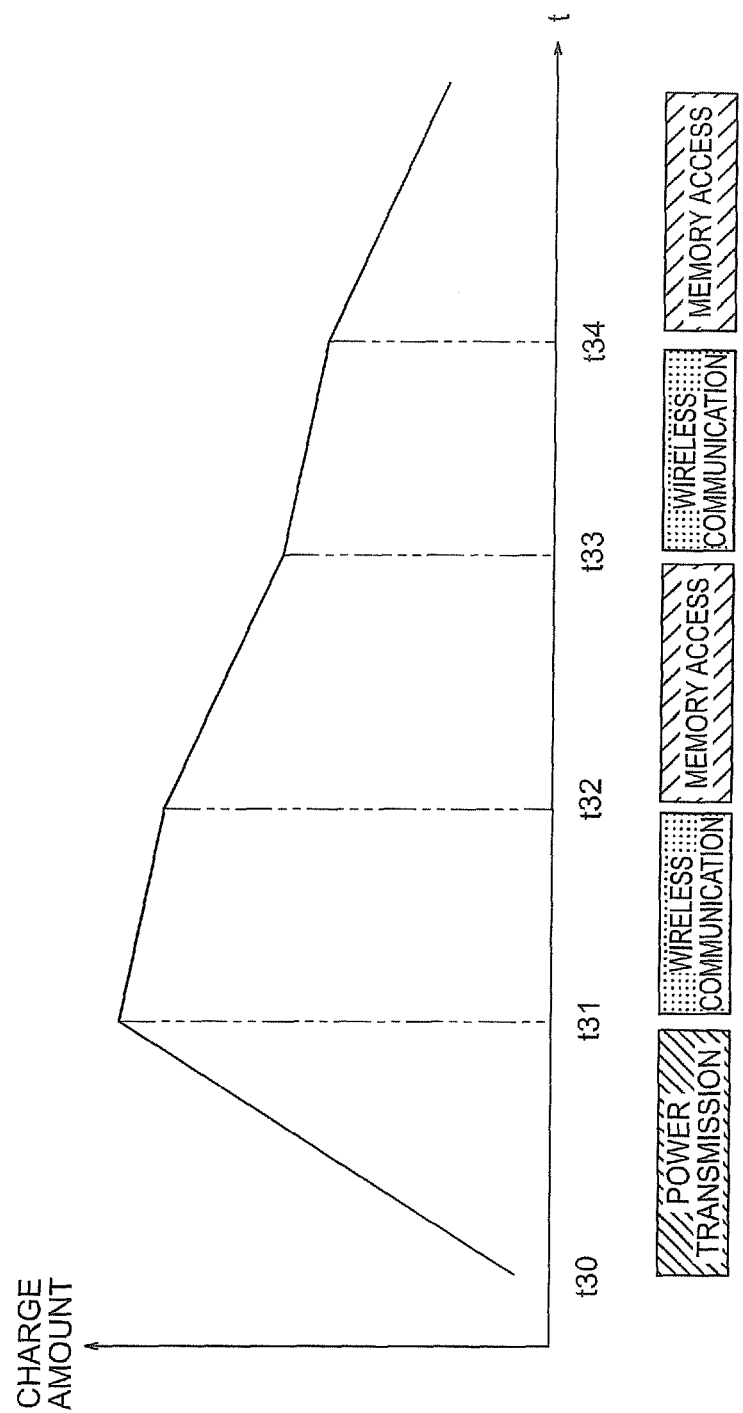
FIG. 15 is a diagram schematically showing a relationship between the amount of charge accumulated in the charge keeping module 22 and a processing operation of the power transmission and reception system.

FIG. 15 is a diagram schematically showing a relationship between the amount of charge accumulated in the charge keeping module 22 and a processing operation of the power transmission and reception system. As shown in FIG. 15, the power transmission is performed from the power transmitter 1 to the power receiver 2 and a sufficient charge is accumulated in the charge keeping module 22 (times t30 to t31). Thereafter, a data frame is transmitted from the power transmitter 1 to the power receiver 2 by the wireless communication, and data is written to the buffer 250 of the power receiver 2 (times t31 to t32). Further, the data in the buffer 250 is written to the memory 26 by the controller 24 (time t32 to t33). FIG. 15 shows a situation in which the wireless communication and the memory access are repeatedly performed.

Although the operation described above is a processing operation in which a data frame is transmitted from the power transmitter 1 to the power receiver 2 and the data frame is written to the memory 26, this processing operation is substantially the same as a processing operation in which a data frame is transmitted from the power receiver 2 to the power transmitter 1.

In this way, in the third embodiment, the wireless communication and the memory access are performed exclusively from each other, so that the peak of the power consumption can be further reduced.

Fourth Embodiment

In a fourth embodiment described below, a control frame including a control signal is transmitted in addition to a data frame.

The data length of a normal data frame is long. Therefore, the probability of error occurrence is relatively high. On the other hand, the control frame (communication control frame or management frame) is a signal where the probability of error occurrence is reduced by, for example, improving a modulation manner and/or reducing the data length. Therefore, the control frame has a larger tolerance against interference of an electric wave than that of the data frame. Therefore, even when a control frame is transmitted while the power is being transmitted, error hardly occurs.

Therefore, the wireless communication modules 12 and 25 of the present embodiment transmit a control frame while the power is being transmitted. Some usage examples of the control frame will be described below.

A first example is to establish wireless communication by using a control frame. For example, in the case of FIGS. 6 and 7, after the amount of charge accumulated in the charge keeping module 22 exceeds the amount (THB) necessary to perform the wireless communication (YES in step SA13 in FIG. 6), the wireless communication module 25 transmits the connection start request signal (step SA41 in FIG. 7).

On the other hand, when the controller 24 is notified of the start of power reception in step SA12 in FIG. 6, the controller 24 may perform power-on reset and also control the wireless communication module 25 to transmit a connection start request signal to the power transmitter 1 by using the control frame. Thereby, the time required to establish a connection of the wireless communication can be shortened.

A second example is to notify the completion of the power reception from the power receiver 2 to the power transmitter 1 by using a control frame. In FIG. 6, the completion of the power reception is notified to the power transmitter 1 by the power reception module 20 instead of the wireless communication module 25 (step SA32). Specifically, the load resistance of the coil 21a is changed and the power transmission module 10 detects the change.

On the other hand, the controller 24 which is notified of the completion of the power reception (step SA22) may notify the power transmitter 1 of the completion of the power reception by transmitting a control frame from the wireless communication module 25. Thereby, it is unnecessary to change the load resistance of the coil 21a and detect the change.

A third example is to perform termination processing of the data transmission and disconnection of the communication by using a control frame. In FIG. 7, when the amount of the charge falls below the threshold value THC (YES in step SA15), the controller 24 performs termination processing and transmits the connection stop request signal and the power transmission restart request signal. In other words, the threshold value THC is the amount of charge required to perform all the processing operations mentioned above.

On the other hand, in the present example, when the amount of charge falls below a threshold value THC', the controller 24 transmits the power transmission restart request signal. After the power transmission is restarted, the termination processing and the transmission of the connection stop request signal may be performed by using a control frame. Since the termination processing and the transmission of the connection stop request signal are performed while the power is being transmitted, the threshold value THC' is the amount of charge necessary to transmit the power transmission restart request signal. As a result, the threshold value THC' can be set to lower than the threshold value THC, so that it is possible to perform the wireless communication more efficiently and stably.

As described above, in the fourth embodiment, it is possible to further improve the performance of the power transmission and reception system by performing the wireless communication using the control frame whose tolerance against interference is greater than that of the data frame.

At least a part of the power transmission and reception system explained in the above embodiments can be formed of hardware or software. When the power transmission and reception system is partially formed of the software, it is possible to store a program implementing at least a partial function of the power transmission and reception system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the power transmission and reception system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A power transmission and reception system comprising a power transmitter and a power receiver,
wherein the power transmitter comprises:
a power transmission module configured to wirelessly transmit power to the power receiver; and
a first wireless communication module configured to perform wireless communication of a data frame comprising data with the power receiver;
wherein the power receiver comprises:
a power reception module configured to receive the power transmitted from the power transmission module; and
a second wireless communication module configured to perform wireless communication of the data frame with the first wireless communication module using the received power;
wherein the second wireless communication module is configured to perform wireless communication while the power reception module is not receiving the power;
wherein the second wireless communication module is configured to perform the wireless communication of a controller frame comprising a control signal with the power transmitter; and
wherein an interference tolerance of the control frame is larger than an interference tolerance of the data frame.

2. The system of claim 1, wherein the power reception module comprises:
a coil configured to receive an electric wave configured to transmit the power;
a power reception controller configured to convert the electric wave to a current; and a charge keeping module configured to accumulate charge by the current; and wherein the power receiver further comprises:

a charge monitor configured to monitor an amount of charge accumulated in the charge keeping module; and a controller configured to stop a power transmission and to start the wireless communication by the second wireless communication module when the amount of charge accumulated in the charge keeping module is above a first threshold.

3. The system of claim 2, wherein the controller is configured to stop the power transmission from the power transmitter by changing a load resistance of the coil when the amount of charge accumulated in the charge keeping module is above the first threshold.

4. The system of claim 2, wherein the controller is configured to stop the wireless communication by the second wireless communication module and to restart the power transmission from the power transmitter when the amount of charge accumulated in the charge keeping module is below a second threshold.

5. The system of claim 2, wherein the power receiver further comprises a memory accessible by the controller, data being written in and read from the memory, and wherein the controller is configured to access the memory while the second wireless communication module performs the wireless communication.

6. The system of claim 2, wherein the power receiver further comprises a memory accessible by the controller, data being written in and read from the memory, and wherein the controller is configured to access the memory while the power reception module is receiving the power.

7. The system of claim 6, wherein the second wireless communication module comprises a buffer, the data being written in and read from the buffer, and the second wireless communication module is configured to read the data from the buffer and/or to write the data in the buffer during performing the wireless communication, and wherein the controller is configured to read the data written in the memory and to write the read data in the buffer and/or to read the data written in the buffer and to write the read data in the memory while the power reception module is receiving the power.

8. The system of claim 2, wherein the power receiver further comprises a memory accessible by the controller, data being written in and read out from the memory, and wherein the controller is configured to access the memory while the power reception module is not receiving the power and the second wireless communication module is not performing the wireless communication.

9. The system of claim 2, wherein the charge keeping module comprises a battery capable of storing the power received by the power reception module.

10. The system of claim 1, wherein a frequency of an electric wave that transmits the power is 13.56 MHz.

11. A power receiver configured to perform wireless communication with a power transmitter, the power transmitter comprising a power transmission module configured to wirelessly transmit power, and a first wireless communication module configured to perform wireless communication of a data frame comprising data, the power receiver comprising:

a power reception module configured to receive the power transmitted from the power transmission module; and a second wireless communication module configured to perform wireless communication of the data frame with the first wireless communication module using the received power;

wherein the second wireless communication module is configured to perform wireless communication while the power reception module is not receiving the power;

wherein the second wireless communication module is configured to perform the wireless communication of a controller frame comprising a control signal with the power transmitter; and wherein an interference tolerance of the control frame is larger than an interference tolerance of the data frame.

12. The receiver of claim 11, wherein the power reception module comprises:

a coil configured to receive an electric wave configured to transmit the power;

a power reception controller configured to convert the electric wave to a current; and a charge keeping module configured to accumulate charge by the current; and wherein the power receiver further comprises:

a charge monitor configured to monitor an amount of charge accumulated in the charge keeping module; and a controller configured to stop a power transmission and to start the wireless communication by the second wireless communication module when the amount of charge accumulated in the charge keeping module is above a first threshold.

13. The receiver of claim 12, wherein the controller is configured to stop the power transmission from the power transmitter by changing a load resistance of the coil when the amount of charge accumulated in the charge keeping module is above the first threshold.

14. The receiver of claim 12, wherein the controller is configured to stop the wireless communication by the second wireless communication module and to restart the power transmission from the power transmitter when the amount of charge accumulated in the charge keeping module is below a second threshold.

15. The receiver of claim 12, further comprising a memory accessible by the controller, data being written in and read from the memory, wherein the controller is configured to access the memory while the second wireless communication module is performing the wireless communication.

16. The receiver of claim 12, further comprising a memory accessible by the controller, data being written in and read from the memory, wherein the controller is configured to access the memory while the power reception module is receiving the power.

17. The receiver of claim 16, wherein the second wireless communication module comprises a buffer, the data being written in and read from the buffer, and the second wireless communication module is configured to read the data from the buffer and/or to write the data in the buffer during performing the wireless communication, and wherein the controller is configured to read the data written in the memory and to write the read data in the buffer and/or to read the data written in the buffer and to write the read data in the memory while the power reception module is receiving the power.

18. The receiver of claim 12, further comprising a memory accessible by the controller, data being written in and read out from the memory, wherein the controller is configured to access the memory while the power reception module is not receiving the power and the second wireless communication module is not performing the wireless communication.

19. A power transmitter configured to perform wireless communication with a power receiver, the power receiver comprising a power reception module configured to wirelessly receive power, and a first wireless communication module configured to perform wireless communication of a data frame comprising data using the received power, the power transmitter comprising:
- a power transmission module configured to wirelessly transmit the power to the power reception module; and
- a second wireless communication module configured to perform wireless communication of the data frame with the power receiver;
- wherein the second wireless communication module is configured to perform wireless communication while the power transmission module is not transmitting the power;
- wherein the second wireless communication module is configured to perform the wireless communication of a controller frame comprising a control signal with the power receiver; and
- wherein an interference tolerance of the control frame is larger than an interference tolerance of the data frame.

* * * * *